United States Patent
Kim et al.

(10) Patent No.: US 11,790,555 B2
(45) Date of Patent: Oct. 17, 2023

(54) SYSTEM AND METHOD FOR FUSION RECOGNITION USING ACTIVE STICK FILTER

(71) Applicant: Electronics and Telecommunications Research Institute, Daejeon (KR)

(72) Inventors: Jin Woo Kim, Daejeon (KR); Ki Tae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 350 days.

(21) Appl. No.: 17/150,391

(22) Filed: Jan. 15, 2021

(65) Prior Publication Data

US 2021/0224616 A1    Jul. 22, 2021

(30) Foreign Application Priority Data

Jan. 17, 2020    (KR) .................. 10-2020-0006331
Jan. 31, 2020    (KR) .................. 10-2020-0011547

(51) Int. Cl.
   *G06T 7/80*         (2017.01)
   *G06V 20/56*      (2022.01)
   (Continued)

(52) U.S. Cl.
   CPC ............. *G06T 7/80* (2017.01); *G06F 18/251* (2023.01); *G06V 10/803* (2022.01);
(Continued)

(58) Field of Classification Search
   CPC ............. G06T 7/80; G06T 2207/20084; G06T 2207/30252; G06F 18/251; G06F 18/253;
(Continued)

(56) References Cited

U.S. PATENT DOCUMENTS 9,154,741 B2    10/2015    Jang et al.
10,037,472 B1    7/2018    Chen et al.
(Continued)

FOREIGN PATENT DOCUMENTS

JP        2012-68935      4/2012
KR    10-2018-0081997    7/2018
(Continued)

OTHER PUBLICATIONS

Shahian Jahromi, Babak, Theja Tulabandhula, and Sabri Cetin. "Real-time hybrid multi-sensor fusion framework for perception in autonomous vehicles." Sensors 19.20 (2019): 4357. (Year: 2019).*

*Primary Examiner* — Fayyaz Alam
(74) *Attorney, Agent, or Firm* — KILE PARK REED & HOUTTEMAN PLLC

(57) ABSTRACT

Provided is a system and method for fusion recognition using an active stick filter. The system for fusion recognition using the active stick filter includes a data input unit configured to receive input information for calibration between an image and a heterogeneous sensor, a matrix calculation unit configured to calculate a correlation for projection of information of the heterogeneous sensor, a projection unit configured to project the information of the heterogeneous sensor onto an image domain using the correlation, and a two-dimensional (2D) heterogeneous sensor fusion unit configured to perform stick calibration modeling and design and apply a stick calibration filter.

20 Claims, 8 Drawing Sheets

(51) Int. Cl.
  *G06F 18/25* (2023.01)
  *G06V 10/80* (2022.01)
  *G06V 20/58* (2022.01)
(52) U.S. Cl.
  CPC ............ *G06V 10/806* (2022.01); *G06V 20/56* (2022.01); *G06V 20/58* (2022.01); *G06V 20/588* (2022.01)
(58) Field of Classification Search
  CPC .... G06V 10/803; G06V 10/806; G06V 20/56; G06V 20/58; G06V 20/588; G06V 2201/08
  See application file for complete search history.

(56) References Cited

U.S. PATENT DOCUMENTS

| | | |
|---|---|---|
| 11,024,055 B2 * | 6/2021 | Hsu ........................... G06T 7/75 |
| 2009/0154793 A1 | 6/2009 | Shin et al. |
| 2014/0088814 A1 | 3/2014 | You et al. |
| 2019/0147254 A1 * | 5/2019 | Bai ...................... G01S 17/931 |
| | | 382/104 |
| 2021/0051317 A1 * | 2/2021 | Yan ........................... G06T 7/80 |
| 2022/0327737 A1 * | 10/2022 | Wilhelm ................ G06V 20/64 |

FOREIGN PATENT DOCUMENTS

| | | |
|---|---|---|
| KR | 10-1887436 | 9/2018 |
| KR | 10-2018-0106417 | 10/2018 |
| KR | 10-2019-0049871 | 5/2019 |
| KR | 10-2019-0095592 | 8/2019 |

* cited by examiner

SYSTEM AND METHOD FOR FUSION RECOGNITION USING ACTIVE STICK FILTER

CROSS-REFERENCE TO RELATED APPLICATION

This application claims priority to and the benefit of Korean Patent Application No. 10-2020-0006331, filed on Jan. 17, 2020, and Korean Patent Application No. 10-2020-0011547, filed on Jan. 31, 2020, the disclosure of which is incorporated herein by reference in its entirety.

BACKGROUND

1. Field of the Invention

The present invention relates to a system and method for fusion recognition using an active stick filter.

2. Discussion of Related Art

In the fields of driving intelligence assistance systems and autonomous driving systems of today, research is being actively conducted on sensor fusion technology for recognizing the position of front/rear moving objects.

According to the related art, in order to obviate limitation of the position estimation that may be inaccurate depending on shaking of the attitude (pitch) of a vehicle and the slope of a road (downhill/uphill), the pitch is calculated by calculating a vehicle lane or a vanishing point. However, estimation for a certain distance or more is still inaccurate.

SUMMARY OF THE INVENTION

The present invention provides a system and method for fusion recognition using an active stick filter that are capable of accurately utilizing a detection area of an image and information of a hetero sensor (a radar, a LiDAR, etc.) in an active manner by proposing a new calibration method required to project position information of the heterogeneous sensor onto moving object information detected in the image for fusion.

The technical objectives of the present invention are not limited to the above, and other objectives may become apparent to those of ordinary skill in the art based on the following description.

According to one aspect of the present invention, there is provided a system for fusion recognition using an active stick filter, the system including a data input unit configured to receive input information for calibration between an image and a heterogeneous sensor, a matrix calculation unit configured to calculate a correlation for projection of information of the heterogeneous sensor, a projection unit configured to project the information of the heterogeneous sensor onto an image domain using the correlation, and a two-dimensional (2D) heterogeneous sensor fusion unit configured to perform stick calibration modeling and design and apply a stick calibration filter.

According to another aspect of the present invention, there is provided a system for fusion recognition using an active stick filter, the system including: an input unit configured to receive two-dimensional (2D) image information, 2D sensor information, and vehicle information; a memory which stores a program for projecting coordinates of the 2D sensor information onto the 2D image information in consideration of the vehicle information; and a processor configured to execute the program, wherein the processor matches information of a heterogeneous sensor to an inside of an object detection area in an image so as to perform fusion recognition using a heterogeneous sensor.

According to another aspect of the present invention, there is provided a method of fusion recognition using an active stick filter, the method including the steps of: (a) receiving input information for calibration between an image and a heterogeneous sensor; (b) calculating a correlation for projection of information of the heterogeneous sensor; (c) projecting the information of the heterogeneous sensor onto an image domain using the correlation; and (d) performing stick calibration modeling and designing and applying a stick calibration filter.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
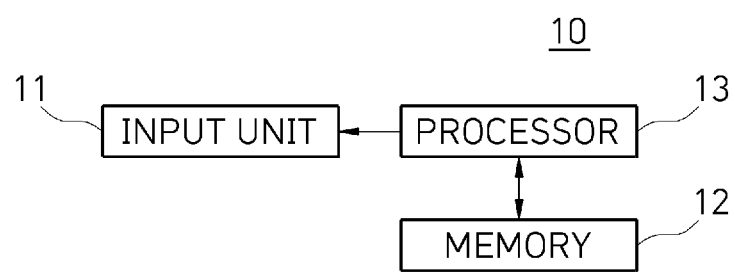
FIGS. 1 and 2 illustrate a system for fusion recognition using an active stick filter according to an embodiment of the present invention.

Hereinafter, the above and other objectives, advantages, and features of the present invention and ways of achieving them will become readily apparent with reference to descriptions of the following detailed embodiments in conjunction with the accompanying drawings However, the present invention is not limited to such embodiments and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing the embodiments of the present invention, the background for proposing the present invention will be described first for the sake of understanding of those skilled in the art.

In the fields of driving intelligence assistance systems and autonomous driving systems of today, research is being actively conducted on sensor fusion technology for recognizing the position of front/rear moving objects.

In particular, cases of performing object detection/classification by learning through deep learning from images, and fusing distance estimation/detection sensors, such as a radar, a LiDAR, and the like are increasing.

The commercialized sensor fusion technology is mostly applied to image-based active lane recognition technology (adaptive cruise control (ACC)) and image-based inter-vehicle distance maintenance technology (lane keeping assist system (LKAS)), and is independently used for auto emergency braking (AEB) through front object recognition using a radar.

In order to improve the reliability of position recognition by advancing the object detection and distance estimation method of a radar, fusion technology between heterogeneous sensors is being actively conducted, and fusion of recognized results and a method of fusing information between pieces of raw data are mainly being studied and developed.

Fusion methods according to mutual reliability of sensors and accuracy of recognition have been provided in various forms. Rather than fusion between sensors according to the related art being performed, recognition is performed according to unique characteristics of a sensor, and a heterogeneous sensor merely provides information in an auxiliary form.

The related art proposes a method of estimating a distance and a position according to the height of an object and the position of an object in an image through image-based moving object recognition, which requires an accurate object detection area.

In addition, according to the related art, the distance estimation becomes incorrect as the distance increases according to the resolution of the image, and the position estimation becomes incorrect depending on the attitude shaking (pitch) of the vehicle and the slope of the road (downhill/uphill). Accordingly, the pitch is calculated by calculating a lane or a vanishing point, but the calculation for a certain distance or more is inaccurate.

A technology for compensating for the above-described limitation using a method of fusing a heterogeneous sensor (a radar, a LiDAR, or the like) and recognition information of an image has been proposed. However, since the technology performs calibration based on a flat ground, the calibration is achievable only under the conditions of securing a pitch calibration and a three-dimension (3D) driving map, which requires a large amount of data and is inappropriate for being used in an advanced driver assistance system (ADAS) in terms of processing speed and efficiency.

The present invention is proposed to obviate the above-described limitations and provides a system and method for recognizing the position of an object by matching distance sensor information projected onto an actively detected object in real time by proposing a stick filter that is adaptable to a change in vehicle pitch rate according to a driving environment, such as uphill and downhill as well as a flat ground.

Figure 2:
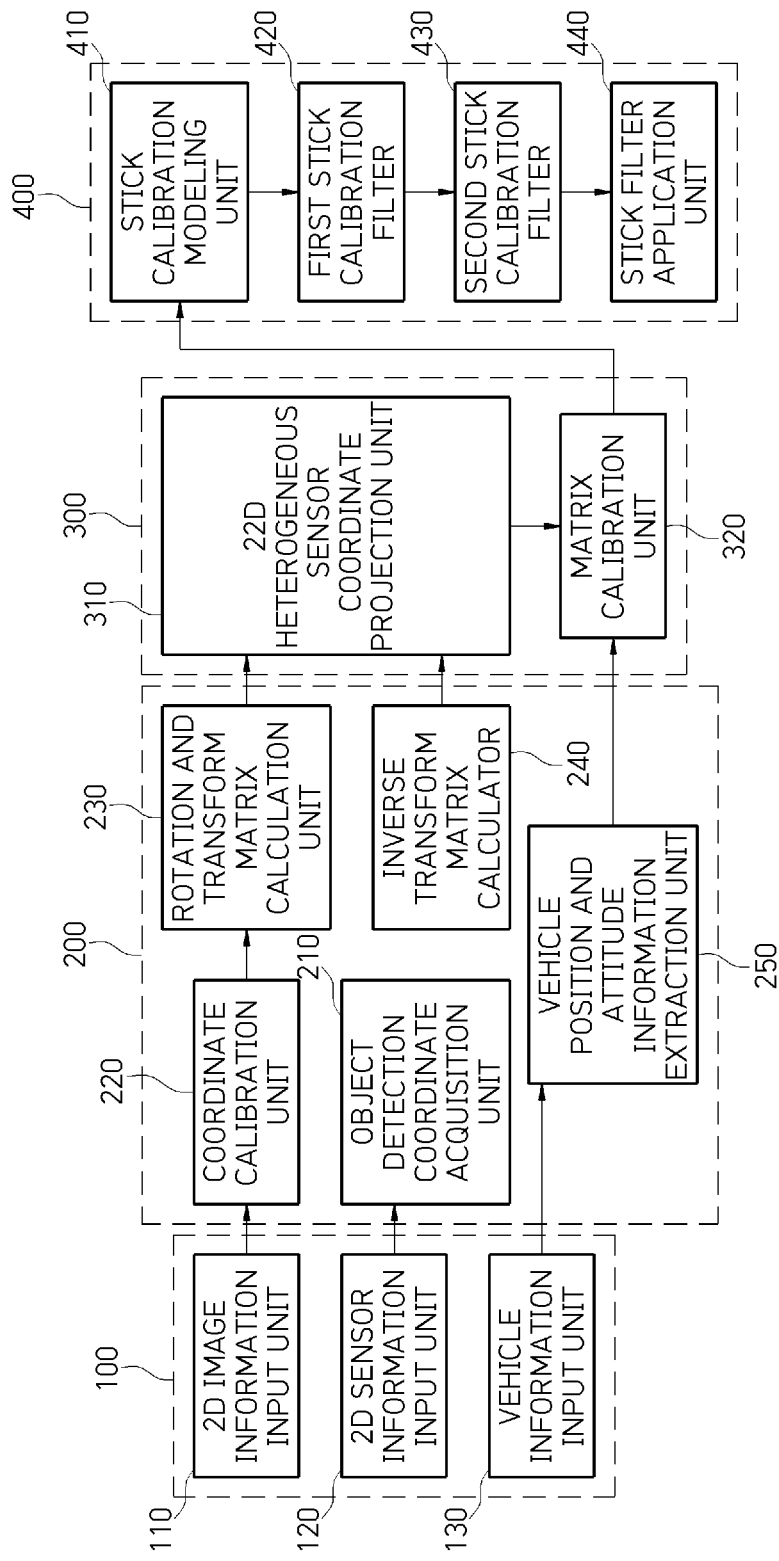

FIGS. 1 and 2 illustrate a system for fusion recognition using an active stick filter according to an embodiment of the present invention.

A system 10 for fusion recognition using an active stick filter according to the present invention is characterized as including an input unit 11 for receiving two-dimensional (2D) image information, 2D sensor information, and vehicle information, a memory 12 which stores a program for projecting coordinates of the 2D sensor information onto the 2D image information in consideration of the vehicle information, and a processor 13 for executing the program, wherein the processor 13 matches information of a heterogeneous sensor to an inside of an object detection area in an image in real time to perform fusion recognition using the heterogeneous sensor.

The processor 13 matches distance sensor information to an object detected in an image in real time using a stick filter that is adaptively used for a change in pitch rate of a vehicle, and recognizes the position of the object.

The processor 13 calculates a rotation and distance transform matrix and an inverse transform matrix, projects 2D coordinates of a heterogeneous sensor onto an image, and calibrates a correlation matrix between heterogeneous sensors using attitude and position information of the vehicle.

The processor 13 uses a first stick calibration filter set as a criterion for selecting the closest coordinates included in an image detection area, and a second stick calibration filter for re-filtering a result of the first stick calibration filter when a substance not located on a driving path overlaps the object detected in the image to remove the overlapping object and adjusts and employs the position, length, and area of a stick filter.

Hereinafter, a configuration of a 2D heterogeneous sensor fusion method and a stick filter will be described with reference to FIG. 2.

The system 10 for fusion recognition using the active stick filter according to the present invention is characterized as including a data input unit 100 configured to receive input information for calibration between an image and a heterogeneous sensor, a matrix calculation unit 200 configured to calculate a correlation for projection of information of the heterogeneous sensor, a projection unit 300 configured to project the information of the heterogeneous sensor onto an image domain using the correlation, and a 2D heterogeneous sensor fusion unit 400 configured to perform stick calibration modeling and design and apply a stick calibration filter.

The data input unit 100 performs input processing on information and data required for calibration between an image and a distance sensor.

The matrix calculation unit 200 calculates a rotation and distance transform matrix indicating a correlation for mutual projection of heterogeneous sensor information.

The projection unit 300 projects distance sensor information onto an image domain using a rotation and distance transform matrix and an inverse transform matrix that are calculated by the matrix calculation unit 200.

The 2D heterogeneous sensor fusion unit 400 performs stick calibration modeling in consideration of reference matrix information, vehicle attitude, and moving object information (a size, a position, etc.) of a surrounding environment and performs fusion by designing/applying a stick calibration filter.

A 2D image information input unit 110 receives 2D image information constructed on the basis of an un-distorted image (a frontal bird eye view) which is composed of a single image or multiple images.

A data input unit 100 provides information of a heterogeneous sensor (a radar/LiDAR) of another domain (a top-down view) in a synchronized state through a 2D sensor information input unit 120.

An object detection coordinate acquisition unit 210 and a coordinate calibration unit 220 acquire four or more pieces of top-down position information using a tool, such as a corner reflector, that allows coordinates of 2D sensor information to be formed within an image range of 2D image information while securing images.

A rotation and transform matrix calculation unit 230 acquires correlation matrix (rotation/transformation) information (Rt Matrix) using the images and the coordinate information of the 2D sensor information acquired in the above-described process.

An inverse transform matrix calculator 240 calculates an inverse transform matrix (Inv. Rt Matrix) by inversely transforming the result output from the rotation and transform matrix calculator 230, and the inverse transform matrix is stored together with the rotation and transform matrix.

A 2D heterogeneous sensor coordinate projection unit 310 outputs 2D sensor information in real time on the basis of the correlation matrix obtained by the rotation and transform matrix calculation unit 230 and the inverse transform matrix obtained by the inverse transform matrix calculation unit 240 and converts object detection 2D coordinates into an image domain through the inverse transform matrix to display the image domain in a 2D image.

At the same time, the 2D heterogeneous sensor coordinate projection unit 310 converts the calculated information and compares the converted calculated information with the position of the 2D sensor information displayed on the object and stores correlation coefficient data for the difference resulting from the comparison.

Vehicle information input through a vehicle information input unit 130 is extracted as vehicle attitude (pitch, yaw, roll) information obtained through an inertial measuring unit (IMU) through a vehicle position and attitude information extraction unit 250 and satellite coordinate (x, y, z) information obtained through a global positioning system (GPS), and the vehicle information is provided to an initial heterogeneous sensor calibration module of a matrix calibration unit 320.

The heterogeneous sensor-to-heterogeneous sensor correlation matrix (rotation/transform) information obtained from the 2D heterogeneous sensor coordinate projection unit 310 is synchronized with the vehicle attitude and position information extracted from the vehicle location and attitude information extraction unit 250 and is provided to a flat ground-based calibration module of the matrix calibration unit 320.

The matrix calibration unit 320 calibrates the initial heterogeneous sensor-to-heterogeneous sensor correlation matrix (rotation/transform) according to a change in the attitude and position of the vehicle in the flat ground state.

Figure 3:
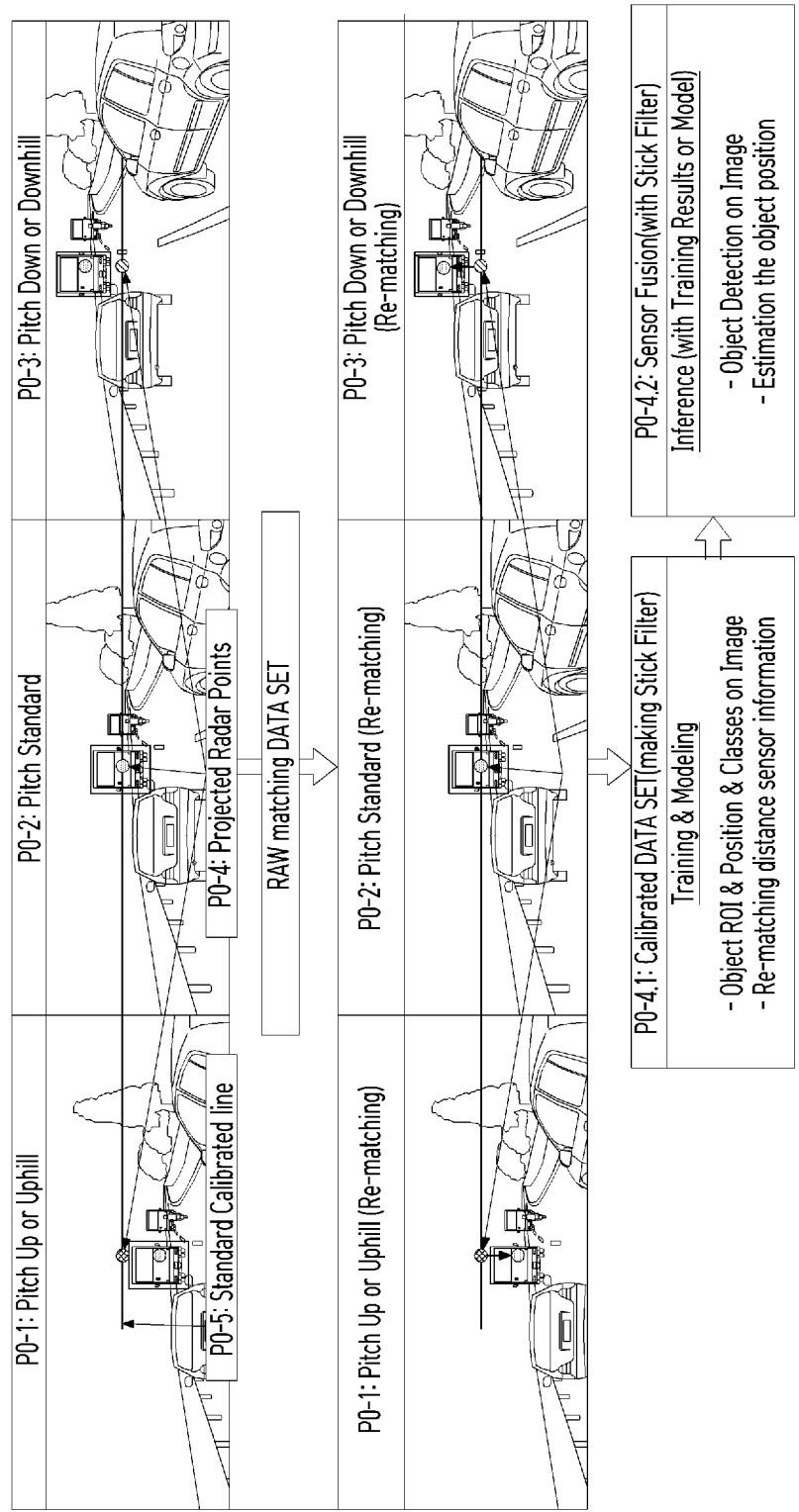
FIG. 3 illustrates a process of stick calibration modeling/learning and sensor fusion according to an embodiment of the present invention.

The matrix calibration unit 320 calculates an additional rotation/transform matrix and compensates for the deviation and shaking of the coordinates projected onto the image-based object detected at a middle or remote distance due to the shaking and attitude change of the vehicle equipped with the sensor FIG. 3 shows a state that occurs when an attitude (pitch) of a vehicle is greatly shaken, which also occurs when driving uphill/downhill.

According to the related art, the distance of a front moving object is estimated on the basis of a high-speed section road that assumes flat ground, but a method of estimating the distance on the basis of a single camera or a method of estimating the distance by obtaining only coordinates of radar information included in a range of a lane is difficult to apply to a case that occurs on an uphill/downhill road with regard to calibrating a pitch, which is attitude information of a vehicle.

A stick calibration modeling unit 410, in order to obviate mismatching between heterogeneous sensors that occurs on an uphill/downhill road as well as the limitation in calibrating the attitude (pitch) of the vehicle, constructs a stick calibration modeling and provides the stick calibration modeling to a first stick calibration filter 420 and a second stick calibration filter 430.

The stick calibration modeling unit 410 basically matches heterogeneous sensor (radar/LiDAR) information in real time to a recognition area detected and tracked in a driving environment located on a slope.

Information used in the stick calibration modeling unit 410 includes detection information (the position of an object) of a heterogeneous sensor not classified in an image that is provided from a sensor, size information and tracking information of an object detected in an image, object position and position information fused between an image and a distance sensor (a heterogeneous sensor) based on a slope calculated by the matrix calibration unit 320, and a 3D map (information required for initial calibration) identifying position and attitude information of a vehicle located on a slope with which the stick calibration modeling unit 410 constructs stick modeling required for calibration as a non-linear function.

A stick calibration model constructed by the stick calibration modeling unit 410 is basically provided to determine the length of a stick and provide a basic function that, when mismatch occurs between heterogeneous sensors as shown in FIG. 3, actively varies the length of the stick so that sensor information is matched.

The first stick calibration filter 420 is provided to fuse the calibration result and the modeling result of the matrix calibration unit 320 and the stick calibration modeling unit 410, performs the construction according to specific classifications of a vehicle (a sedan/sport utility vehicle (SUV)/bus/pedestrian/truck) on the basis of vehicle attitude and slope information input in real time at an initial heterogeneous sensor calibration, and holds various models according to classes so as to actively apply the construction according to the type of an object recognized in the image.

The classification according to the type of a moving object by the first stick calibration filter 420 is performed because the size recognized in an actual image and the detection coordinates matched from the heterogeneous sensor (a radar/a LiDAR) vary with the type, and the construction needs to be differently applied depending on the vehicle attitude and the slope.

Figure 5:
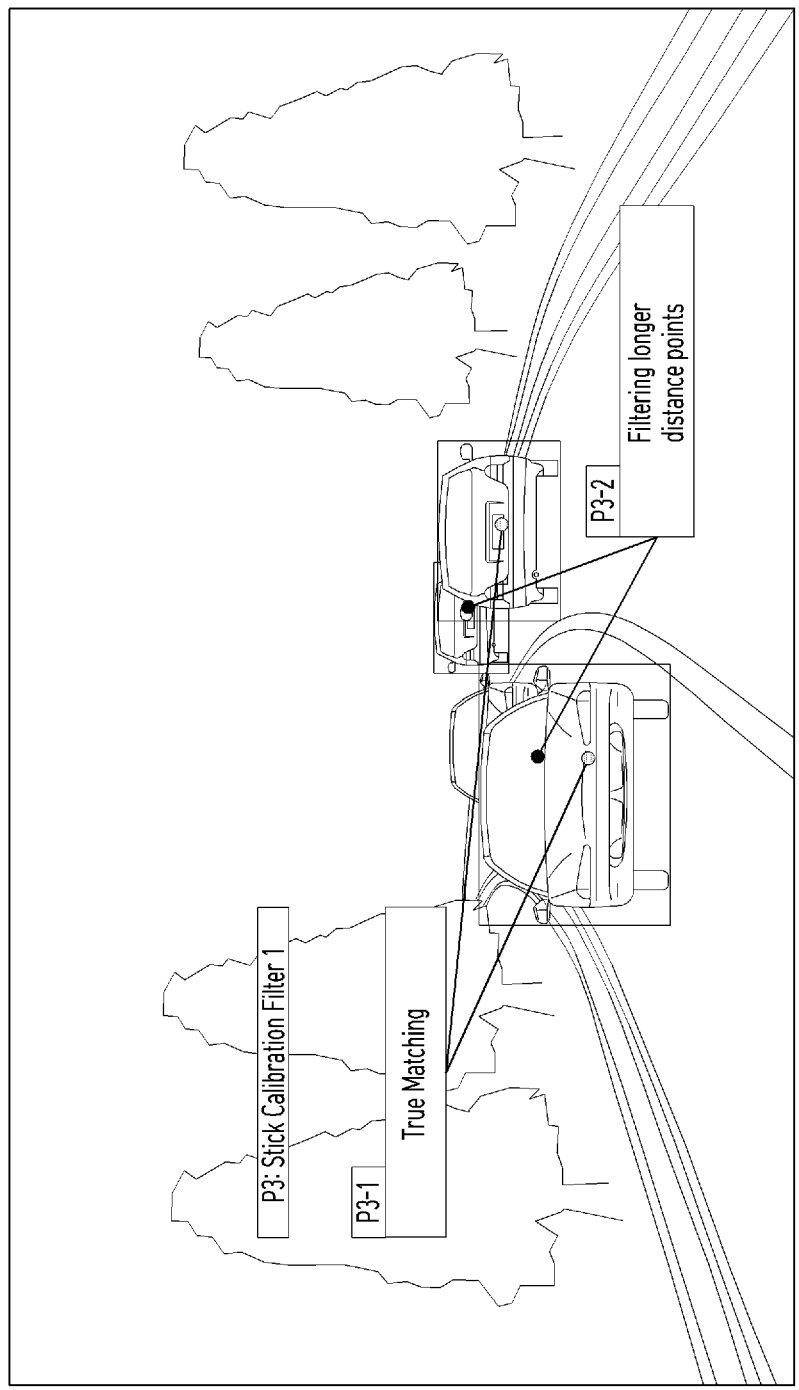
FIG. 5 illustrates a method of designing a first stick calibration filter according to an embodiment of the present invention.

The second stick calibration filter 430 is configured to, in response to information of a heterogeneous sensor (a radar/LiDAR) being matched to a specific vehicle/pedestrian, remove the information when the information overlaps an object area having the same position coordinates in an image domain, as shown in FIG. 5.

Referring to FIG. 5, sensor measurement information included in a range of a moving object detected in an image basically selects shortest distance coordinates.

In addition, the second stick calibration filter 430 represents a filter to exclude characteristics of a radar that detects small corners or objects (fallen leaves, manhole covers, open or cracked roads, traces of buried wire work, etc.) that do not interfere with driving, and when object position information of a heterogeneous sensor that may occur on a curve is projected onto an image, exclude information of a heterogeneous sensor (a radar/LiDAR) detected in a short range (which is not a driving area) but projected onto an image in a detection area of a moving object (a vehicle/human) located at a remote/middle distance.

A stick filter application unit 440 receives sensor fusion calibration information estimated through the first stick calibration filter 420 and the second stick calibration filter 430 and real-time image and heterogeneous sensor (radar/LiDAR) information on the basis of the stick calibration modeling generated by the stick calibration modeling unit 410 and adjusts and applies the position, length, and area of the stick filter to match image information to distance sensor information.

FIG. 3 illustrates stick calibration modeling/learning and sensor fusion of the stick calibration modeling unit according to the embodiment of the present invention.

Referring to results from P0-2, a result of calibrating 2D coordinate projection of a heterogeneous sensor based on a flat ground is shown as P0-1 in which a result of a distance sensor is not matched with an image when the vehicle attitude is raised (pitch up) or when the position of a preceding vehicle is located on an uphill, and P0-3, which is the opposite to P0-1 with a pitch down or downhill.

The stick calibration modeling unit 410 stores result data [P0-4.1] obtained by re-matching an image detection/distance heterogeneous sensor detection, which is a result of matching 2D image information and 2D sensor information, that is, a result of matching raw data, with a distance sensor detection position corresponding to a detection area as shown in P0-1.1 and P0-2.1, P0-3.1, according to the conditions of a vehicle/pedestrian in various environments.

The stick calibration modeling unit 410 estimates a non-linear function that may be modeled based on information of P0-4.1, and the non-linear function is referred to as a stick calibration modeling function.

In addition, the stick calibration modeling unit 410 constructs a deep learning network on the basis of the data of P0-4.1 and trains the deep learning network and, by providing 2D image information and 2D sensor information as input information, estimates distance position information according to the relationship between an image and a distance sensor.

The stick model or stick learning network constructed from P0-4.1 adjusts a matching result on the basis of a 2D heterogeneous sensor coordinate projection result calibrated on the flat ground and a calibrated matrix and outputs a result that allows the distance to be estimated with only the image.

In the following, a process of designing a stick filter design and applying the stick filter will be described.

Figure 4A:
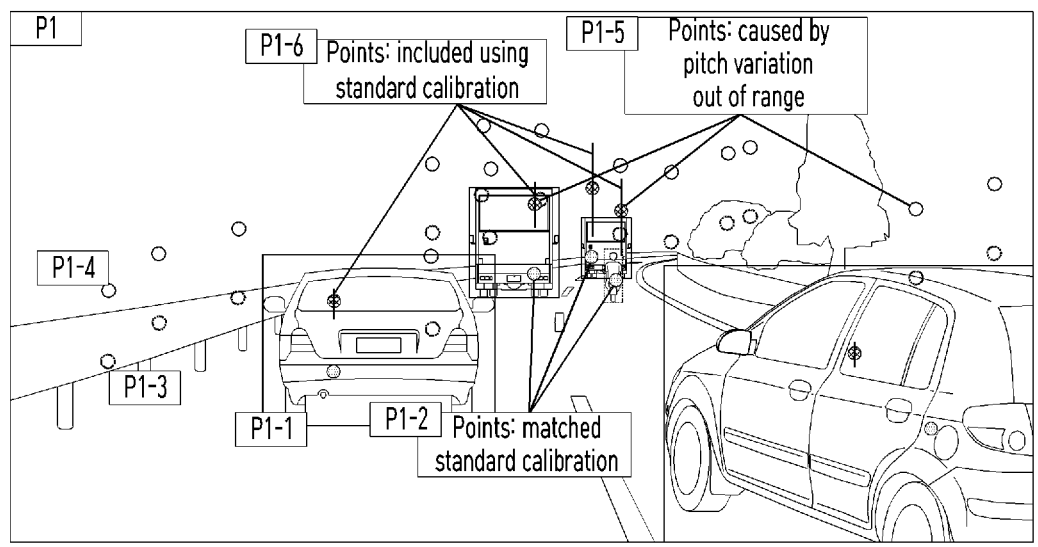
FIGS. 4A and 4B illustrate results of applying a stick filter according to an embodiment of the present invention.

FIG. 4A illustrates a result of applying a stick filter according to an embodiment of the present invention in response to a vehicle attitude (pitch-down) or a state of a front moving object located on a downhill.

P1-1 shows a result of detecting an area of the moving object in an image.

P1-3 shows a result of projecting position information regarding object detection of a heterogeneous sensor on the basis of a calibration result between an image sensor and a heterogeneous sensor in a state of a flat ground.

P1-2 shows a result that is included in the result of P1-1 (the area detection result of the moving object) among the results of P1-3.

P1-4 shows a result of projecting position information regarding object detection of the heterogeneous sensor on the basis of the calibration result between the image sensor and the heterogeneous sensor according to the vehicle attitude (pitch-down) or the state of the front moving object being located on a downhill.

P1-5 shows a projection result that should be included in the result of P1-1 among the results of P1-4 but fails to be included in the result of P1-1 due to a change in the vehicle attitude (pitch-down) or the state of the front moving object being located on a downhill.

P1-6 is a result of differently applying the length of the stick filter according to the type, size, and position of the vehicle using the stick calibration filter modeling result of the stick calibration modeling unit 410.

That is, P1-6 is a result of fusing to include 2D coordinates, which are not included in the area of P-1, of the position of the moving object detected by the heterogeneous sensor and projected onto the image domain according to the changed result.

Figure 4B:
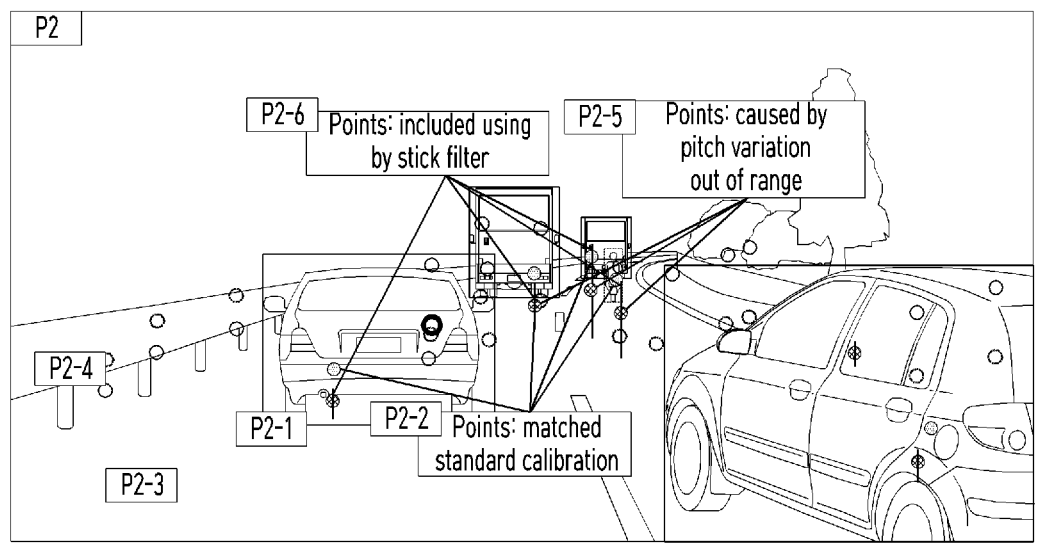

FIG. 4B illustrates a result of applying a stick filter determined by the stick calibration modeling unit 410 in response to a vehicle attitude (pitch-up) or a state of a front moving object being located on an uphill according to an embodiment of the present invention. P2 shows a result of applying the stick filter in a situation opposite to P1 in which the vehicle is in an attitude (pitch-up), or the front moving object is located on an uphill.

P2-5 shows a projection result that should be included in the result of P2-1 but fails to be included in the result of P2-1 due to a change in the vehicle attitude (pitch-up) or the state of the front moving object being located on an uphill.

P2-6 is a result of differently applying the length of the stick filter according to the type, size, and position of the vehicle using the stick calibration filter modeling result of the stick calibration modeling unit 410.

FIG. 5 illustrates a method of designing a first stick calibration filter according to an embodiment of the present invention.

P3 shown in FIG. 5 describes the first stick calibration filter 420, which is a filter configured to, when coordinates (positions) of a plurality of heterogeneous sensors (a radar/LiDAR) are matched in a detection area of a moving object (a vehicle/pedestrian) in an image, select information corresponding to the moving object in practice.

A criterion for selecting true matching P3-1 and filtering longer distance points P3-2 is based on selecting the closest coordinates included in the image detection area.

The method may be used when an object not included in a driving path except for the moving object (a vehicle/pedestrian) does not overlap in terms of distance.

Figure 6:
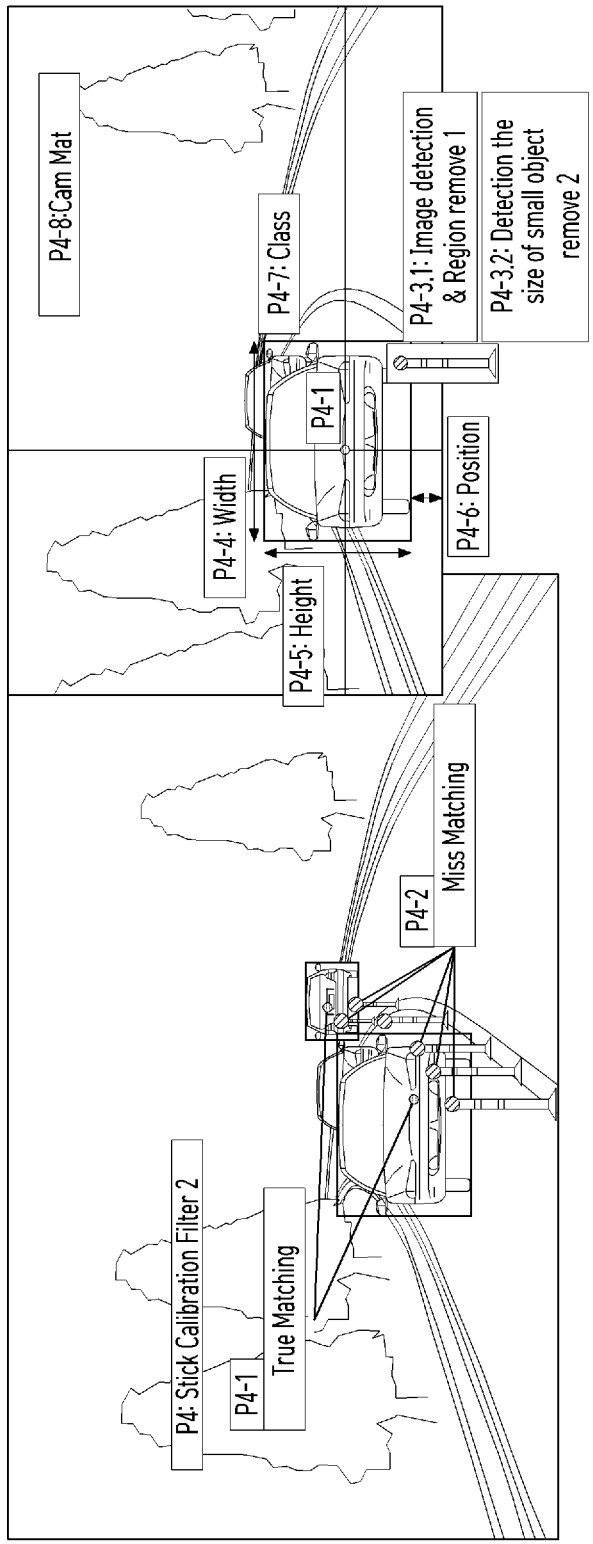
FIG. 6 illustrates a method of designing a second stick calibration filter according to an embodiment of the present invention.

FIG. 6 illustrates a method of designing a second stick calibration filter 430 according to an embodiment of the present invention.

P4 shown in FIG. 6 describes the second stick calibration filter 430, which is configured to, when an object, which is not located on a driving path, two-dimensionally overlaps on a projection of distance sensor information on an image, re-filter the result of the first stick calibration filter 420 to remove erroneous detection.

P4-1 is a distance sensor position coordinate result being matched to the original image, but according to the criteria of the first stick calibration filter 420, a road traffic safety rod not located on the driving path may be viewed as overlapping within the area as in P4-2 upon projection of the image.

A method of removing the type (P4-7:Class) of the moving object detected in the image, the horizontal size (P4-4: Width) of the moving object detected in the image, the vertical size (P4-5:Height) of the moving object detected in the image, the relative coordinate position in the entire image (P4-6:Position) of the moving object detected in the image, and the position (P4-1) to which the distance sensor needs to be originally matched in the entire image on the basis of information according to consecutive frames when another image area overlaps a detected image area detected as shown in P4-3.1, and a method of removing an image detection result including a detected object size provided by a heterogeneous sensor (a radar/LiDAR) and the position of an object matched in an image on the basis of a criterion according to the type (class) and the detection size may be used for the processing.

Figure 7:
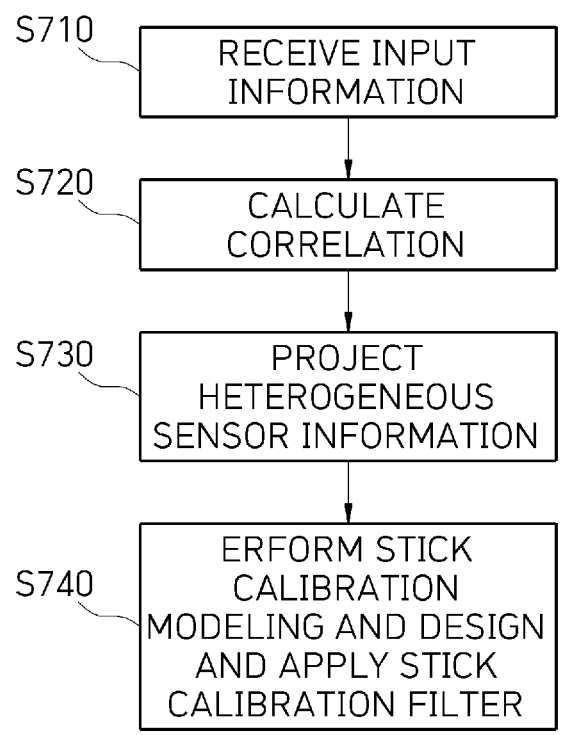
FIG. 7 illustrates a method of fusion recognition using an active stick filter according to an embodiment of the present invention.

FIG. 7 illustrates a method of fusion recognition using an active stick filter according to an embodiment of the present invention.

The method of fusion recognition using an active stick filter according to the present invention is characterized as including receiving input information for calibration between an image and a heterogeneous sensor (S710), calculating a correlation for projection of heterogeneous sensor information (S720), projecting the heterogeneous sensor information onto an image domain using the correlation (S730), performing stick calibration modeling, and designing and applying a stick calibration filter (S740).

In operation S710, vehicle attitude information and satellite coordinate information are received, and 2D image information and 2D sensor information are transmitted in a synchronized state.

In operation S720, a rotation and distance transform matrix and an inverse transform matrix are calculated.

In operation S720, a rotation and distance transform matrix and an inverse transform matrix are calculated using image and coordinate information of a heterogeneous sensor.

In operation S730, the 2D sensor information is output in real time, object detection 2D coordinates are converted into an image domain, and the image domain is displayed on a 2D image using the rotation and distance transform matrix and the inverse transform matrix.

In operation S730, the projection unit converts calculated information and correlation coefficient data resulting from comparing the converted calculated information with the position of the 2D sensor information displayed on an object is stored.

In operation S730, a correlation matrix between heterogeneous sensors is calibrated using vehicle attitude and position information.

In operation S730, an additional rotation and transform matrix is calculated to compensate for deviation and shaking of coordinates projected on the object.

In operation S740, stick calibration modeling is performed in consideration of reference matrix information, vehicle attitude information, and moving object information, and a first stick calibration filter and a second stick calibration filter are designed and applied.

In operation S740, information of the heterogeneous sensor is matched in real time to a recognition area detected and tracked in a driving environment located on a slope.

In operation S740, stick modeling required for calibration is constructed as a nonlinear function using detection information of the heterogeneous sensor, size and tracking information of an object detected in an image, position and distance information of the object fused between an image and a distance sensor, and 3D map information.

In operation S740, when mismatching occurs between heterogeneous sensors, the length of the stick is varied to match information of the heterogeneous sensors.

The first stick calibration filter fuses a matrix calibration result of the projection unit and a modeling result of the stick calibration modeling unit according to the type of the moving object and sets a criterion for selecting the closest coordinate included in an image detection area.

The second stick calibration filter re-filters the result of the first stick calibration filter when an object not located on a driving path overlaps the moving object in an image.

The second stick calibration filter performs re-filtering using the type, size, and relative coordinate position of the moving object.

Meanwhile, the method of fusion recognition according to the embodiment of the present invention may be implemented in a computer system or may be recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of fusion recognition according to the embodiment of the present invention may be implemented in a computer-executable form. When the method of fusion recognition according to the embodiment of the present invention is performed by the computer, instructions readable by the computer may perform the method of fusion recognition according to the embodiment of the present invention.

Meanwhile, the method of fusion recognition according to the embodiment of the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

As is apparent from the above, a filter for calibrating different pieces of two-dimensional (2D) sensor information and a fusion recognition method thereof are proposed to match information of a heterogeneous sensor (a radar, a LiDAR, etc.) projected into an object detection area of an image in real time regardless of a change in attitude of a vehicle and a slope of a road so that sensor fusion is utilized with a high reliability.

The effects of the present invention are not limited to those described above, and other effects not mentioned above will be clearly understood by those skilled in the art from the above detailed description.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A system for fusion recognition using an active stick filter, the system comprising:
   an input unit configured to receive input information for calibration between an image and a heterogeneous sensor;
   a memory which stores a program for projecting the information of the heterogeneous sensor onto an image domain using a correlation; and
   a processor configured to execute the program stored in the memory,
   wherein the processor matches information of the heterogeneous sensor to an inside of an object detection area in the image by using the active stick filter, so as to perform fusion recognition using the heterogeneous sensor, by calculating the correlation for projection of information of the heterogeneous sensor, performing stick calibration modeling, designing and applying a stick calibration filter, and projecting the information of the heterogeneous sensor onto an image domain using the correlation.

2. The system of claim 1, wherein the input unit receives vehicle attitude information and satellite coordinate information and transmits 2D image information and 2D sensor information that are synchronized with each other.

3. The system of claim 1, wherein the processor calculates a rotation and distance transform matrix and an inverse transform matrix.

4. The system of claim 1, wherein the processor calculates a rotation and distance transform matrix and an inverse transform matrix using the image and coordinate information of the heterogeneous sensor.

5. The system of claim 4, wherein the processor outputs 2D sensor information in real time and converts object detection 2D coordinates into an image domain using the rotation and distance transform matrix and the inverse transform matrix to display the image domain on a 2D image.

6. The system of claim 5, wherein the processor converts calculated information and stores correlation coefficient data resulting from comparing the converted calculated information with a position of the 2D sensor information displayed on an object.

7. The system of claim 4, wherein the processor calibrates a correlation matrix between heterogeneous sensors using vehicle attitude and position information.

8. The system of claim 7, wherein the processor calculates an additional rotation and transform matrix to compensate for deviation and shaking of coordinates projected on an object.

9. The system of claim 1, wherein the processor includes a stick calibration modeling unit that performs the stick calibration modeling in consideration of reference matrix information, vehicle attitude information, moving object information, and designs and applies a first stick calibration filter and a second stick calibration filter.

10. The system of claim 9, wherein the stick calibration modeling unit matches the information of the heterogeneous sensor in real time to a recognition area detected and tracked in a driving environment located on a slope.

11. The system of claim 10, wherein the stick calibration modeling unit constructs stick modeling required for calibration as a nonlinear function using detection information of the heterogeneous sensor, size and tracking information of an object detected in the image, position and distance information of the object fused between the image and a distance sensor, and three-dimensional (3D) map information.

12. The system of claim 11, wherein the stick calibration modeling unit, in response to a mismatch occurring between heterogeneous sensors, varies a length of the stick to match the information of the heterogeneous sensor.

13. The system of claim 9, wherein the first stick calibration filter fuses a matrix calibration result of the projection unit and a modeling result of the stick calibration modeling unit according to a type of the moving object and sets a criterion for selecting closest coordinates included in an image detection area.

14. The system of claim 13, wherein the second stick calibration filter re-filters a result of the first stick calibration filter when an object not located on a driving path overlaps the moving object in the image.

15. The system of claim 14, wherein the second stick calibration filter performs the re-filtering using a type, a size, and a relative coordinate position of the moving object.

16. A system for fusion recognition using an active stick filter,
the system comprising:
an input unit configured to receive two-dimensional (2D) image information, 2D sensor information, and vehicle information;
a memory which stores a program for projecting coordinates of the 2D sensor information onto the 2D image information in consideration of the vehicle information; and
a processor configured to execute the program stored in the memory,
wherein the processor matches information of a heterogeneous sensor to an inside of an object detection area in an image by using the active stick filter, so as to perform fusion recognition using the heterogeneous sensor.

17. The system of claim 16, wherein the processor matches distance sensor information to an object detected in the image using the active stick filter, which is adaptively used in response to a change in pitch rate of a vehicle, and recognizes a position of the object.

18. The system of claim 17, wherein the processor calculates a rotation and distance transform matrix and an inverse transform matrix, projects 2D coordinates of the heterogeneous sensor onto an image using the rotation and distance transform matrix and the inverse transform matrix, and calibrates a correlation matrix relative to the heterogeneous sensor using attitude and position information of the vehicle.

19. The system of claim 18, wherein the processor uses a first stick calibration filter set as a criterion for selecting closest coordinates included in an image detection area, and a second stick calibration filter for re-filtering a result of the first stick when a substance not located on a driving path overlaps the object detected in the image to remove the overlapping object and adjusts and employs a position, length, and area of the active stick filter.

20. A method of fusion recognition using an active stick filter, the method comprising the steps of:
(a) receiving two-dimensional (2D) image information, 2D sensor information, and vehicle information; and
(b) projecting coordinates of the 2D sensor information onto the 2D image information in consideration of the vehicle information, by matching information of a heterogeneous sensor to an inside of an object detection area in an image, by using the active stick filter, so as to perform fusion recognition using the heterogeneous sensor.

* * * * *